April 19, 1932.    L. BINDER ET AL    1,854,640
MEANS FOR MEASURING HIGH ELECTRICAL POTENTIALS
Filed Nov. 6, 1930    2 Sheets-Sheet 1
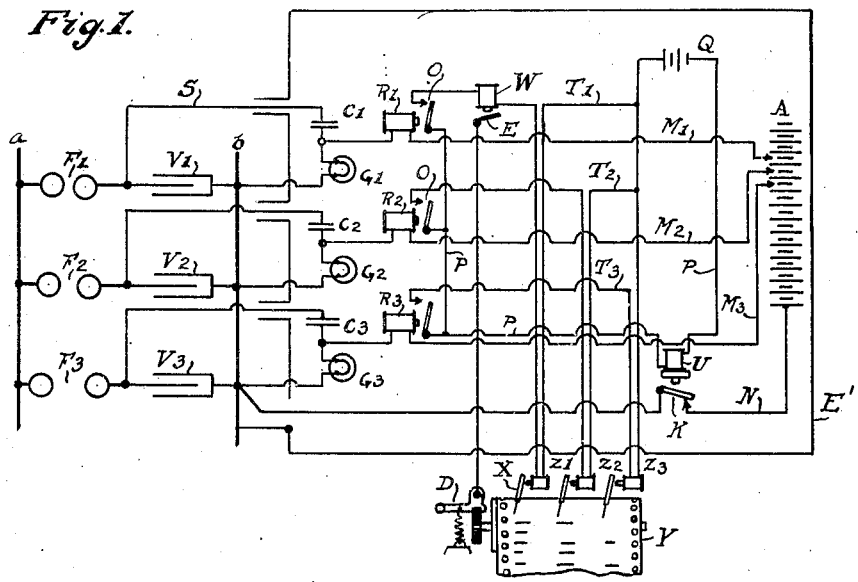
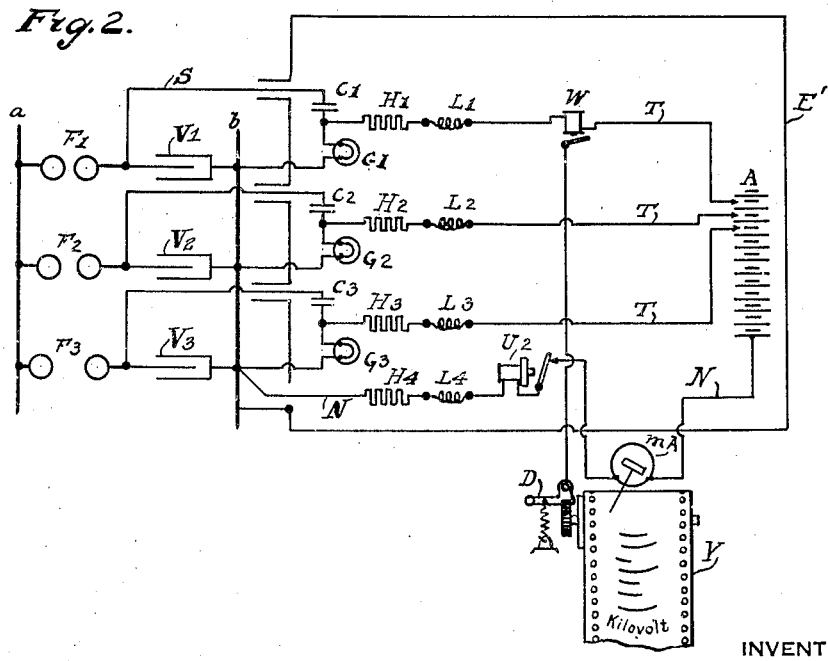
INVENTORS
Ludwig Binder
Hans Heyne
By Harold D. Penney
ATTORNEY April 19, 1932.   L. BINDER ET AL   1,854,640
MEANS FOR MEASURING HIGH ELECTRICAL POTENTIALS
Filed Nov. 6, 1930   2 Sheets-Sheet 2

INVENTORS
Ludwig Binder
Hans Heyne
By Harold D. Penney
ATTORNEY

Patented Apr. 19, 1932

1,854,640

UNITED STATES PATENT OFFICE

LUDWIG BINDER, OF DRESDEN, AND HANS HEYNE, OF DRESDEN, BLASEWITZ, GERMANY

MEANS FOR MEASURING HIGH ELECTRICAL POTENTIALS

Application filed November 6, 1930, Serial No. 493,730, and in Germany March 21, 1928.

This invention relates to methods and apparatus for measuring high voltages and potentials by means of the electric spark gap.

The ball spark-gap represents, due to its simplicity, accuracy, freedom from lag and other advantages, one of the most important means for measuring high voltages. These advantages make it also valuable for the measuring of excess potential phenomena. The procedure in the measuring by means of the ordinary spark-gaps consists in starting from large rupturing distances, and causing the balls to gradually approach one another until the rupture occurs. This method is, of course, only applicable if the potential to be measured exists for a sufficiently long period, or if the potential impulses repeat themselves in the same form as often as is necessary in order to be able to adjust the spark-gaps to the limiting sparking distance.

But many excess-voltage phenomena, for instance those caused by atmospheric discharges, occur only once, or in irregular order of succession, so that no possibility is presented for the adjustment by hand of a spark-gap to measure such voltage. Accordingly, we have provided an arrangement in which several spark gaps are connnected in parallel previously adjusted for various rupturing distances.

Such arrangements are shown in the accompanying drawings, in which

Fig. 1 is a diagrammatic view of one form of the invention having recording means;

Fig. 2 is a similar view of another form having recording means;

Figure 3:
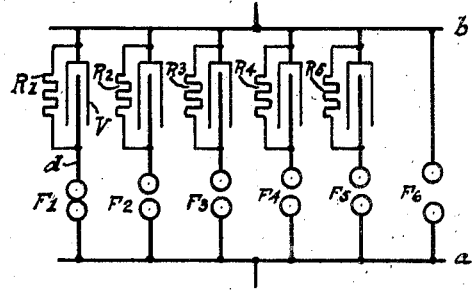
Fig. 3 is a similar view showing a less elaborate form of the invention.

As shown in Figs. 1 to 3, the spark gaps F1, F2, F3, F4, F5, F6 are progressively further apart, the object being to provide an arrangement whereby a low potential between elements $a$ and $b$ will cause sparking at only the shortest gap F1, while a greater potential would cause simultaneous sparking, at a progressively larger number of gaps in proportion to the value of the potential.

In order to insure that sparking shall not be at only the shortest spark gap, since that would immediately cause a great lowering of the measuring potential, provision is made to damp the spark discharges correspondingly. For instance, in series with the individual spark-gaps are interposed ohmic resistances, choke coils or condensers or combinations thereof.

Of these possibilities preference must be given to the use of condensers, since, on the one hand, they best fulfill the condition, in that they occupy least possible volume and give the largest possible resistance, which is of importance for the constructive development, and since, on the other hand, such an arrangement, respresents in fact a series-connection of a condenser with a spark-gap (which is a second condenser), the potential division within this element is independent of the frequency of the measuring potential in periodical phenomena.

Since however, a ball spark-gap is a condenser of relatively small capacity, the earth capacity $c$ of the central part $d$, of such an arrangement (shown schematically by Fig. 4) influences not inconsiderably the potential distribution. The deviation of the proportion of the potential at the series-connected condenser to the potential at the spark-gap of an arrangement with earth capacity of the central part from the potential proportion of the same arrangement but without earth capacity of the central part, may amount under circumstances to several hundred per cent. From this it follows, that such a measuring arrangement with earth capacity of the central part must always be calibrated anew according to the local conditions. It is furthermore evident that the potential distribution over the series-connected condensers and the spark-gaps of such a measuring arrangement is not independent of other external influences, as for instance neighboring lines carrying a potential.

Figure 4:
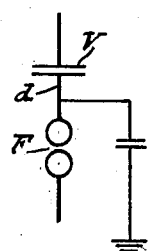
Figs. 4 and 5 are schematic diagrams illustrating forces which have to be considered in perfecting this invention.

Now, it is the object of the present invention to provide efficient and practical measuring arrangements of the kind above indicated rendering them free from the above mentioned disturbing variable influences of the earth capacities at the middle parts, as represented schematically in Fig. 4.

Figure 5:
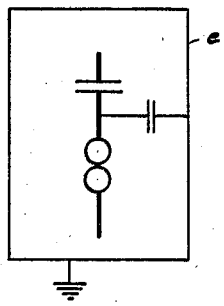

This may be accomplished in various ways. Either, the value of the earth capacity as such is maintained and care is taken, by means of suitable provisions, such as metallic, grounded enclosures $e$ (Fig. 5), that the earth capacity of the central parts remains constant with a change in location of the measuring arrangement. This embodiment is visualized in Fig. 5 for an element of the measuring arrangement and may of course be applied correspondingly to the entire measuring arrangement.

Figure 6:
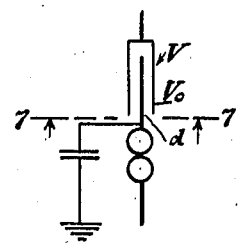
Fig. 6 illustrates a preferred form of condenser.
Figure 7:
Fig. 7 is a section on the line 7—7 of Fig. 6.

On the other hand however, the disturbing variable influence of the earth capacity of the central part may also be eliminated by reducing the earth capacity of the middle part $d$ as much as possible so that its influence may be neglected with a change in location of the measuring apparatus. One way, amongst others, of accomplishing this consists in constructing the series-connected condensers so that their outer element encloses the inner element, or at least the central part $d$, as fully as possible, as is done, by way of example in the cylinder-like construction of the outer element $Vo$ of the series-condenser (Figs. 6 and 7) which encloses the inner element $d$. Thereby, the earth capacity of the central part is shielded or at least sufficiently reduced.

A measuring arrangement with several spark-gaps, adjusted to different rupturing distances and constructed with condensers in the shape of cylinders is shown in Fig. 3. For the prevention of errors in measurement due to residual discharges, which perhaps might remain behind in the individual condensers, it is recommended that the condensers be bridged by high-ohmic resistances R1, R2 . . . By eliminating the condenser at the longest spark-gap F6, this gap serves also as a protecting spark-gap for the entire measuring apparatus.

In order that such a measuring arrangement shall furnish faultless data in case of rapidly and widely varying voltages, it is necessary that the individual spark-gaps shall respond without lag. As is already known, this may be accomplished by using radium or other suitable substances. However, in accordance with the present invention the individual spark-gaps are arranged in such a manner that there takes place with each response a mutual arcing in a progressive manner. In this case, the spark gap with minimum rupturing distance does not act as a measuring spark-gap but acts solely for preparing the arcing of the next successive measuring spark-gap, which latter then again prepares the arcing of the following one.

The size of the series-condensers may be chosen in such manner that the potential component belonging thereto can be neglected with respect to the potential at the spark-gap. This is rendered particularly easy according to the construction of Fig. 3. In this case the series-condensers may further be graduated so that the percentage of their potential component to that of the spark-gap is the same in all individual elements.

The progressive increase in the response of the successive individual spark-gaps may be accomplished in various ways, thus, for instance, in that the individual spark-gaps are adjusted to different rupturing lengths as is shown in Figs. 1 to 3. But the same result may be obtained by giving the condensers different sizes or also by employing both methods simultaneously.

With each response of a spark-gap there is a sudden potential increase of the mentioned central part $d$ between the gap and the corresponding series-condenser, for the reason that now the entire potential difference practically goes solely to said part. This potential increase may now be utilized directly or indirectly for the release of indicating and recording devices.

An embodiment utilizing this increase is shown in Fig. 1. As will be explained more fully below $a$ and $b$ designate the connections for the potential to be measured, F the spark-gaps, V the series-connected condensers, G glow-tubes connected in series with a potential source A and connected over partial condensers C with the potential of the series condensers V of the measuring arrangement. With the response of the associated spark-gap the potential increase of any series condenser V results in the lighting of the glow-tube G. Hence, more glow tubes will be lighted in accordance with the number of spark-gaps, which respond in accordance with the potential which occurred.

As will be explained, the currents flowing through the individual glow-tubes may act either individually directly on measuring instruments or other indicating devices or indirectly through relays and the like; or, for instance, the entire current of the glow-tubes may take over this function. By means of suitable self-breaking relays or other known devices the glowing of the glow-tubes may be interrupted after the lighting, thereby rendering the measuring arrangement again ready for service. When recording instruments are used, the measuring arrangement may be developed, for instance for the measuring of excess-voltages due to lightning by the corresponding use of a further relay, in such manner that a releasing device of the recording instrument is released by said relay, so that the first occurring excess potential automatically puts the entire measuring arrangement in operation.

In the apparatus of Fig. 1, a pair of conducting elements $a$ and $b$ between which the potential difference is to be measured are connected by a plurality of spark gaps, F1, F2, F3 connected in parallel with each other between said elements, said spark gaps being made progressively longer as shown, or otherwise constructed to give progressively different rupturing values.

Condensers V1, V2, V3 are interposed between said elements $b$ and the respective spark gaps, the inner element adjacent to the gap being shown as substantially laterally surrounded by the outer element.

A shunt S is disposed around each condenser, each having a partial capacity C and a glow tube G interposed in series therein, the glow tube being between the capacity and the outer element of the condenser, whereby when rupture takes place, the increased potential at the inner element of the condenser will cause current which will cause the glow tube to light up.

Individual conductors M1, M2, M3, connect one end of a source of potential A to a point of the respective shunts S between the glow tube and the capacity C. A common conductor N connects the other end of said source to the conducting element adjacent to the condensers, whereby when a glow tube lights up current may pass through its associated individual conductors M. Relays R1, R2, R3 are interposed in the respective individual conductors, each relay comprising a switch O adapted to close when the associated glow tube lights.

A common conductor P connects one terminal of a local source of current Q to one element of all of said switches O; while separate conductors T1, T2, T3 connect the other pole to the other element of the respective switches O.

Recording devices Z1, Z2, Z3 are interposed in said separate conductors respectively, each device comprising an electromagnet and an armature X carrying a pencil engaging a strip of paper Y moved by a clockwork (not shown).

When rupture takes place at any spark gap, current passes through the associated relay and recording device magnet, causing the pencil to make a mark upon the paper Y. If rupture takes place at one or more gaps it will take place at the shortest gap F1; and a releasing magnet W interposed in the branch conductor T1 associated with the smallest gap F1 will be energized and draw an armature E, connected with a detent D of the clockwork, whereby whenever any rupture takes place, the clockwork will be caused to move the record strip one space for the next record.

A retarded relay U having its magnet interposed in the common conductor P of the local source, acts to open a switch K in the main conductor, thereby stopping current through the glow tubes, releasing the associated relays and rendering the recording devices ready for the next measurement.

The currents flowing through the glow-tubes as a result of sparking at the associated spark-gaps cause the relays R to respond, which latter in turn close again the circuits of the battery Q for the magnet coils of the recording devices Z. The relay U, connected in the common feeding circuit for the coils of the recording devices operates with a small retardation, and after each rupture interrupts the circuit of the glow-tubes after the number of the glow-tubes which responded to the rupture has been correspondingly recorded by the devices Z.

The relay W, connected in the circuit of the switch of the relay R1 of the minimum measuring potential, causes the response of the measuring arrangement to release the detent D of the clock mechanism or other driving mechanism for the paper strip of the recording device to permit the paper to move the same required distance for each record.

The apparatus is suitably surrounded, for reduction of the earth capacity, with a metallic enclosure E' which is connected with the conducting element $b$.

Fig. 2 shows, by way of example, another arrangement of the apparatus wherein, from the size of the deflection of an ordinary or recording milliammeter, a deduction may be made as to the value of the excess voltage which occurred; hence, the scale of this instrument may be calibrated directly in kilovolts.

In Fig. 2, the elements $a$, $b$, the gaps F, the condensers V, and glow tubes G, the source A, the releasing magnet W and detent D are the same as in Fig. 1.

But in Fig. 2, the separate conductors, and the common conductor N respectively have interposed therein, a high ohmic resistance H and a self-inductance L to hold back the periodic surges of the high voltages from the recording device. A milliammeter or similar instrument $mA$ connected in the common feeding conductor N from the source A to the glow tubes G, hence shows a deflection which is the larger the greater the current consumption, that is, which is larger when more glow-tubes are lighted and spark-gaps have responded, hence the greater in proportion to the excess voltage which has occurred.

The automatic retarder circuit breaker U2 in the common conductor N serves to stop the flow of current through the instrument $mA$ as soon as the latter has reached its maximum deflection, thus to prepare the apparatus for the next record.

Figure 8:
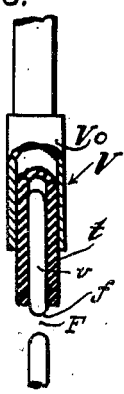
Fig. 8 is a side elevation partly in section showing a practical form of condenser.

A convenient practical form of condenser is shown in Fig. 8 in which a small conducting rod $v$ with rounded end $f$ forms at the same time one element of the spark gap F and the inner element of the condenser V. A tube $t$ of dielectric material receives the outer condenser element $Vo$, in the form of a brass tube.

In order to get correct indications or records of the apparatus above described, even with very quick phenomena, as lightning etc., it is necessary that the arcing of the respective air gaps takes place without any delay. This will be attained by pre-ionizing each of the measuring air gaps in a certain degree. For this reason we have arranged the air gaps so near each other that the spark of each air gap (except the largest) will illuminate the air gap of the next higher value. Some of the rays of the spark are of such kind as to ionize the air gap of the higher value thus facilitating the arcing of the latter in the moment the voltage reaches the amount the air gap is adjusted for. It has been found by experiments that this arrangement is sufficient to get the respective air gaps arcing even if the voltage to be measured exists just for the shortest possible time; as for instance with lightning.

We claim as our invention:

1. In apparatus for measuring potentials, in combination, a pair of elements between which the potential is to be measured; means forming a plurality of spark gaps connected in parallel between said elements, respective spark gaps having different predetermined rupturing values, and means for indicating the passage of sparks across the respective gaps.

2. In apparatus for measuring potentials, in combination, a pair of elements between which the potential is to be measured; means forming a plurality of spark gaps connected in parallel between said elements, respective spark gaps having different rupturing values, means for indicating the passage of sparks across the respective gaps; and means for protecting the apparatus against external influences.

3. In apparatus for measuring potentials, in combination, a pair of elements between which the potential is to be measured; means forming a plurality of spark gaps connected in parallel between said elements, respective spark gaps having different rupturing values, means for indicating the passage of sparks across the respective gaps; and a condenser connected in series with each spark gap and one of said elements.

4. In apparatus for measuring potentials, in combination, a pair of elements between which the potential is to be measured; means forming a plurality of spark gaps connected in parallel between said elements, respective spark gaps having different rupturing values, means for indicating the passage of sparks across the respective gaps; a condenser connected in series with each spark gap and one of said elements; and means for protecting the connecting part between the condenser and the spark gap against external influences, such as earth capacity.

5. In apparatus for measuring potentials, in combination, a pair of conductor elements between which the potential is to be measured; means forming a plurality of spark gaps connected in parallel between said elements, respective spark gaps having different rupturing values, means for indicating the passage of sparks across the respective gaps; and a condenser connected in series with each spark gap and one of said conductor elements; the condenser element adjacent to the adjacent conductor element substantially surrounding the condenser element adjacent to the spark gaps.

6. In apparatus for measuring potentials, in combination, a pair of elements between which the potential is to be measured; means forming a plurality of spark gaps connected in parallel between said elements, respective spark gaps having different rupturing values, means for indicating the passage of sparks across the respective gaps; and a condenser connected in series with each spark gap and one of said elements, and having its parts so proportioned that the potential component thereof is very small as compared with that of the spark gap.

7. In apparatus for measuring potentials, in combination, a pair of elements between which the potential is to be measured; means forming a plurality of spark gaps connected in parallel between said elements, respective spark gaps having different rupturing values, means for indicating the passage of sparks across the respective gaps; and a condenser connected in series between one of said conducting elements and each of said spark gaps except one.

8. In apparatus for measuring potentials, in combination, a pair of elements between which the potential is to be measured; means forming a plurality of spark gaps connected in parallel between said elements, respective spark gaps having different rupturing values, means for indicating the passage of sparks across the respective gaps; a condenser connected in series with each spark gap and one of said elements; and a high ohmic resistance shunted around each condenser.

9. In apparatus for measuring potentials, in combination, a pair of elements between which the potential is to be measured; means forming a plurality of spark gaps connected in parallel between said elements, respective spark gaps having different rupturing values; condensers one each connecting a spark gap to one of said elements; and indicating means set in operation by rise in potential between a condenser and adjacent spark gap.

10. In apparatus for measuring potentials, in combination, a pair of elements between which the potential is to be measured; means forming a plurality of spark gaps connected in parallel between said elements, respective spark gaps having different rupturing values; a condenser connected in series with each spark gap and one of said elements; and a glow tube set in operation by rise in potential between a condenser and adjacent spark gap.

11. In apparatus for measuring potentials, in combination, a pair of elements between which the potential is to be measured; means forming a plurality of spark gaps connected in parallel between said elements, respective spark gaps having different rupturing values; a condenser connected in series with each spark gap and one of said elements; and a glow tube shunted around each condenser.

12. In apparatus for measuring potentials, in combination, a pair of elements between which the potential is to be measured; means forming a plurality of spark gaps connected in parallel between said elements, respective spark gaps having different rupturing values; means for indicating the passage of sparks across respective gaps; a condenser connected in series with each spark gap and one of said elements; and a glow tube and a capacity shunted in series with each other around each condenser.

Signed at Dresden, Saxony, Germany, this 21st day of October A. D. 1930.

LUDWIG BINDER.
HANS HEYNE.